US012498421B2

(12) United States Patent
Tian et al.

(10) Patent No.: US 12,498,421 B2
(45) Date of Patent: Dec. 16, 2025

(54) POTENTIOMETER DEVICE AND METHOD FOR DETERMINING A NUMBER OF CLOSED DIP SWITCHES

(71) Applicant: Beijing Institute of Petrochemical Technology, Beijing (CN)

(72) Inventors: Xiaoping Tian, Beijing (CN); Changkuan Zou, Beijing (CN); Yao Fu, Beijing (CN); Yuqing Zhang, Beijing (CN); Chenwei Tian, Beijing (CN); Lei Du, Beijing (CN)

(73) Assignee: Beijing Institute of Petrochemical Technology, Beijing (CN)

( * ) Notice: Subject to any disclaimer, the term of this patent is extended or adjusted under 35 U.S.C. 154(b) by 217 days.

(21) Appl. No.: 18/271,746

(22) PCT Filed: Nov. 25, 2022

(86) PCT No.: PCT/CN2022/134222
§ 371 (c)(1),
(2) Date: Jul. 11, 2023

(87) PCT Pub. No.: WO2023/221449
PCT Pub. Date: Nov. 23, 2023

(65) Prior Publication Data
US 2024/0410945 A1    Dec. 12, 2024

(30) Foreign Application Priority Data
May 18, 2022  (CN) .......................... 202210550118.6

(51) Int. Cl.
*G01R 31/327*    (2006.01)
(52) U.S. Cl.
CPC .............................. *G01R 31/3277* (2013.01)
(58) Field of Classification Search
CPC ...................... H01C 10/46; H01C 10/50
See application file for complete search history.

(56) References Cited

U.S. PATENT DOCUMENTS 5,089,768 A    2/1992  Canon
5,319,345 A  *  6/1994  Abe .................... H01C 10/50
                                                      338/48

(Continued)

FOREIGN PATENT DOCUMENTS

CN        201178046 Y      1/2009
CN        102721916 A     10/2012
(Continued)

OTHER PUBLICATIONS

International Search Report and Written Opinion issued by Chinese Patent Office as International Searching Authority in International Application PCT/CN2022/134222, dated Feb. 17, 2023 (10 pages)—Partial English Translation.

*Primary Examiner* — Noam Reisner
(74) *Attorney, Agent, or Firm* — Wilmer Cutler Pickering Hale and Dorr LLP

(57)    ABSTRACT

A potentiometer device and a method for determining a number of closed DIP switches is provided, which belongs to the field of potentiometers. A DIP switch structure is connected in parallel with a potentiometer. The DIP switch structure at least includes a branch circuit formed by connecting one DIP switch and one resistor in series. Compared with a wire-wound potentiometer, a carbon film potentiometer, a straight slide potentiometer, and a rotary potentiometer, a design of a potentiometer controls whether a resistor is connected to a circuit by a DIP switch, can achieve a required voltage division ratio, high debugging speed, and high efficiency only by closing the switch, and there is no problem of slide wear, resistor body wear, or the like. In addition, the DIP switch has certain stability, a closing/opening state of the DIP switch will not be changed easily.

7 Claims, 4 Drawing Sheets

(56) References Cited

U.S. PATENT DOCUMENTS 6,310,419 B1 * 10/2001 Wood .................. H01H 61/00
                                                                310/306
6,331,768 B1 * 12/2001 Drori .................... H03H 7/24
                                                                323/298

FOREIGN PATENT DOCUMENTS

| CN | 104966596 | 9/2017 |
| CN | 107797594 A | 3/2018 |
| CN | 211014434 U | 7/2020 |
| WO | WO-2023/221449 | 11/2023 |

* cited by examiner

```
┌─────────────────────────────────────────────────────────────────┐
│ When a number of DIP switch structures in the potentiometer      │ S1
│ device is N, with a resistor between a variable terminal and a   │
│ second fixed contact of a potentiometer as a reference resistor, │
│ a resistance value of a resistor between a first fixed contact   │
│ and the variable terminal of the potentiometer, a resistance     │
│ value of a resistor in each eighth branch circuit, a resistance  │
│ value of a resistor in each ninth branch circuit, and a          │
│ resistance value of a resistor in each tenth branch circuit are  │
│ set as different multiples of a resistance value of the          │
│ reference resistor                                               │
└─────────────────────────────────────────────────────────────────┘
                              ↓
┌─────────────────────────────────────────────────────────────────┐
│ A resistor connected to the potentiometer device is determined   │ S2
│ according to a number of closed DIP switches of all eighth       │
│ branch circuits, a number of closed DIP switches all ninth       │
│ branch circuits, and a number of closed DIP switches of all      │
│ tenth branch circuits in the potentiometer device                │
└─────────────────────────────────────────────────────────────────┘
                              ↓
┌─────────────────────────────────────────────────────────────────┐
│ A voltage division ratio between the variable terminal and the   │ S3
│ second fixed contact of the potentiometer device is determined   │
│ according to a resistance value of the resistor connected to     │
│ the potentiometer device                                         │
└─────────────────────────────────────────────────────────────────┘
                              ↓
```

The number of closed DIP switches of all eighth branch circuits, the number of closed DIP switches of all ninth branch circuits, and the number of closed DIP switches of all tenth branch circuits in the potentiometer device are changed, step that "a resistor connected to the potentiometer device is determined according to the number of closed DIP switches of all eighth branch circuits, the number of closed DIP switches of all ninth branch circuits, and the number of closed DIP switches of all tenth branch circuits in the potentiometer device" is returned, and voltage division ratios corresponding to different combinations of numbers of closed DIP switches are obtained to form a correspondence table between the numbers of closed DIP switches and the voltage division ratios when the number of the DIP switch structures in the potentiometer device is N  — S4

The number of closed DIP switches of all eighth branch circuits, the number of closed DIP switches of all ninth branch circuits, and the number of closed DIP switches of all tenth branch circuits in the potentiometer device are changed, step that "a resistor connected to the potentiometer device is determined according to the number of closed DIP switches of all eighth branch circuits, the number of closed DIP switches of all ninth branch circuits, and the number of closed DIP switches of all tenth branch circuits in the potentiometer device" is returned, and each correspondence table between the numbers of closed DIP switches and the voltage division ratios when the number N is set to different value is obtained  — S4

The number of closed DIP switches of all eighth branch circuits, the number of closed DIP switches of all ninth branch circuits, and the number of closed DIP switches of all tenth branch circuits in a potentiometer device to be adjusted are obtained by querying a correspondence table corresponding to a number of DIP switch structures in the potentiometer device to be adjusted according to the number of DIP switch structures in the potentiometer device to be adjusted and a target voltage division ratio  — S5

DIP switches in the potentiometer device to be adjusted are closed according to the number of closed DIP switches of all eighth branch circuits, the number of closed DIP switches of all ninth branch circuits, and the number of closed DIP switches of all tenth branch circuits in the potentiometer device to be adjusted  — S6

FIG. 14

POTENTIOMETER DEVICE AND METHOD FOR DETERMINING A NUMBER OF CLOSED DIP SWITCHES

CROSS-REFERENCE TO RELATED APPLICATION

This application is a national stage of International Application No. PCT/CN2022/134222, filed on Nov. 25, 2022, which claims the benefit and priority of Chinese Patent Application No. 202210550118.6 filed on May 18, 2022, and entitled "POTENTIOMETER DEVICE AND METHOD FOR DETERMINING A NUMBER OF CLOSED DIP SWITCHES", the disclosure of each of which is incorporated by reference herein in its entirety.

TECHNICAL FIELD

The present disclosure relates to the technical field of potentiometer, and in particular, to a potentiometer device and a method for determining a number of closed DIP switches.

BACKGROUND

A potentiometer is a resistor element with an adjustable resistance value and used for voltage division, also known as a variable electrical resistor or a variable resistor, which usually includes a resistor body and a movable brush. The potentiometer has three contacts, of which two fixed contacts are located at both ends of the resistor body, and one variable terminal is located at the brush. When the brush moves along the resistor body, the resistance of the resistor body connected to a circuit is changed, and a voltage which has a certain relationship with the position of the brush is formed between the brush and the terminal of the resistor body. A voltage division diagram is shown in FIGS. 1A-1B. In FIGS. 1A-1B, A and C are respectively two fixed contacts, and B is the brush with a variable terminal. When the brush B is located at different positions, different voltages are formed at ends B and C, such as $u_1$ and $u_2$ in FIGS. 1A-1B.

Common potentiometers in the market can be divided into wire-wound potentiometers, carbon film potentiometers, organic solid core potentiometers, and the like according to the material of resistor bodies. The potentiometers can be divided into straight slide potentiometers, rotary potentiometers, and the like according to resistor adjustment modes. In addition, there are also digital potentiometers which control resistors to connect in series by using Metal Oxide Semiconductor (MOS) transistors and are manufactured in combination with an integrated circuit technology.

The existing potentiometers have the following disadvantages in use:
1. When the potentiometer adjusts the resistance, although a range of an adjustable resistance value is large, it is often necessary to determine whether to adjust a desired resistance value by cooperating with a voltmeter or an ammeter; and an adjusting process is time-consuming, and the potentiometer is inconvenient to use.
2. The brush will be displaced due to instability of an external environment (for example, bumps during transportation and shaking of a platform), which results in the change of the resistance value of the potentiometer.
3. The contact of the brush may be virtually connected or burned due to excessive current.
4. The brush and the resistor body are easily worn when the potentiometer is used repeatedly.
5. The resistance value of a digital potentiometer may be adjusted and controlled quickly and accurately through programming, but a working voltage of the digital potentiometer is limited, an internal design of the digital potentiometer is complex, and the cost of the digital potentiometer is relatively high.

In conclusion, it is of great significance for engineering practice to design a new potentiometer with stable performance, long durability, and convenient debugging.

SUMMARY

An objective of some embodiments of the present disclosure is to provide a potentiometer device and a method for determining a number of closed DIP switches to realize convenient debugging, stable performance, and long durability of the potentiometer.

In order to achieve the abovementioned objective, the present disclosure provides the following solutions.

A potentiometer device is provided. The potentiometer device includes a potentiometer and multiple DIP switch structures.

Each DIP switch structure is connected in parallel with the potentiometer.

Each DIP switch structure at least includes a branch circuit formed by connecting one DIP switch and one resistor in series.

Optionally, the DIP switch structure includes a first branch circuit.

One terminal of the first branch circuit is connected to a first fixed contact of the potentiometer, and an other terminal of the first branch circuit is connected to a variable terminal of the potentiometer.

Optionally, the DIP switch structure includes a second branch circuit and a third branch circuit.

The second branch circuit is connected in series with the third branch circuit.

A first terminal of a combination of the second branch circuit and the third branch circuit in series is connected to a first fixed contact of the potentiometer; a second terminal of the combination of the second branch circuit and the third branch circuit in series is connected to a second fixed contact of the potentiometer; and a connecting point of the second branch circuit with the third branch circuit is connected to a variable terminal of the potentiometer.

Optionally, the DIP switch structure includes a fourth branch circuit and a fifth branch circuit.

One terminal of the fourth branch circuit is connected to a first fixed contact of the potentiometer; an other terminal of the fourth branch circuit is connected to a second fixed contact of the potentiometer and one terminal of the fifth branch circuit; and an other terminal of the fifth branch circuit is connected to a variable terminal of the potentiometer.

Optionally, the DIP switch structure includes a sixth branch circuit and a seventh branch circuit.

Both one terminal of the sixth branch circuit and one terminal of the seventh branch circuit are connected to a first fixed contact of the potentiometer; the other terminal of the sixth branch circuit is connected to a second fixed contact of the potentiometer; and an other terminal of the seventh branch circuit is connected to a variable terminal of the potentiometer.

Optionally, the DIP switch structure includes an eighth branch circuit, a ninth branch circuit, and a tenth branch circuit.

The eighth branch circuit, the ninth branch circuit, and the tenth branch circuit are connected end to end in turn to form a triangular 3-terminal type DIP switch structure.

A first terminal of the triangular 3-terminal type DIP switch structure is connected to the first fixed contact of the potentiometer; a second terminal of the triangular 3-terminal type DIP switch structure is connected to the second fixed contact of the potentiometer; and a third terminal of the triangular 3-terminal type DIP switch structure is connected to the variable terminal of the potentiometer.

Optionally, the DIP switch structure includes an eleventh branch circuit, a twelfth branch circuit, and a thirteenth branch circuit.

One terminal of the eleventh branch circuit, one terminal of the twelfth branch circuit, and one terminal of the thirteenth branch circuit are connected at a same point.

An other terminal of the eleventh branch circuit is connected to the first fixed contact of the potentiometer; an other terminal of the twelfth branch circuit is connected to the second fixed contact of the potentiometer; and an other terminal of the thirteenth branch circuit is connected to the variable terminal of the potentiometer.

A method for determining a number of closed DIP switches is provided. The method is used for the foregoing potentiometer device. The method includes:

when a number of DIP switch structures in the potentiometer device is N, with a resistor between a variable terminal and a second fixed contact of a potentiometer as a reference resistor, setting a resistance value of a resistor between a first fixed contact and the variable terminal of the potentiometer, a resistance value of a resistor in each eighth branch circuit, a resistance value of a resistor in each ninth branch circuit, and a resistance value of a resistor in each tenth branch circuit as different multiples of a resistor value of the reference resistor;

determining a resistor connected to the potentiometer device according to a number of closed DIP switches of all eighth branch circuits, a number of closed DIP switches of all ninth branch circuits, and a number of closed DIP switches of all tenth branch circuits in the potentiometer device;

determining a voltage division ratio between the variable terminal and the second fixed contact of the potentiometer device according to the resistance value of the resistor connected to the potentiometer device;

changing the number of closed DIP switches of all eighth branch circuits, the number of closed DIP switches of all ninth branch circuits, and the number of closed DIP switches of all tenth branch circuits in the potentiometer device, returning to step of "determining a resistor connected to the potentiometer device according to a number of closed DIP switches of all eighth branch circuits, a number of closed DIP switches of all ninth branch circuits, and a number of closed DIP switches of all tenth branch circuits in the potentiometer device", and obtaining voltage division ratios corresponding to different combinations of numbers of closed DIP switches to form a correspondence table between the numbers of closed DIP switches and the voltage division ratios when the number of the DIP switch structures in the potentiometer device is N;

changing the number N of the DIP switch structures in the potentiometer device, returning to step of "when a number of DIP switch structures in the potentiometer device is N, with a resistor between a variable terminal and a second fixed contact of the potentiometer as a reference resistor, setting a resistance value of a resistor between a first fixed contact and the variable terminal of the potentiometer, a resistance value of a resistor in the eighth branch circuit, a resistance value of a resistor in the ninth branch circuit, and a resistance value of a resistor in the tenth branch circuit as different multiples of a resistance value of the reference resistor", and obtaining each correspondence table between the numbers of closed DIP switches and the voltage division ratios when the number N is set to different value;

obtaining the number of closed DIP switches of all eighth branch circuits, the number of closed DIP switches of all ninth branch circuits, and the number of closed DIP switches of all tenth branch circuits in the potentiometer device to be adjusted by querying a correspondence table corresponding to a number of DIP switch structures in the potentiometer to be adjusted according to the number of DIP switch structures in the potentiometer device to be adjusted and a target voltage division ratio; and closing DIP switches in the potentiometer device to be adjusted according to the number of closed DIP switches of all eighth branch circuits, the number of closed DIP switches of all ninth branch circuits, and the number of closed DIP switches of all tenth branch circuits in the potentiometer device to be adjusted.

Optionally, a calculation formula for the voltage division ratio between the variable terminal and the second fixed contact of the potentiometer device is:

$$\gamma = \frac{R_{BC}}{R_T} = \frac{\dfrac{1}{1+\dfrac{l}{b}}\left(\dfrac{u}{1+\dfrac{hu}{a}} + \dfrac{1}{1+\dfrac{l}{b}} + \dfrac{c}{m}\right)}{\left(\dfrac{u}{1+\dfrac{hu}{a}} + \dfrac{1}{1+\dfrac{l}{b}}\right)\dfrac{c}{m}},$$

where $\gamma$ represents the voltage division ratio, $R_{BC}$ represents an equivalent resistance between the variable terminal and the second fixed contact of the potentiometer device, $R_T$ represents total resistance of the potentiometer device, u, a, b, and c respectively represent multiples by which the resistance value of the reference resistor is multiplied to obtain the resistance value of the resistor between the first fixed contact and the variable terminal, the resistance value of the resistor in the eighth branch circuit, the resistance value of the resistor in the ninth branch circuit, and the resistance value of the resistor in the tenth branch circuit respectively; and h, l, and m respectively represent the number of closed DIP switches of all eighth branch circuit, the number of closed DIP switches of all ninth branch circuit, and the number of closed DIP switches of all tenth branch circuit in the potentiometer device.

Optionally, after determining the voltage division ratio between the variable terminal and the second fixed contact of the potentiometer device according to the resistance value of the resistor connected to the potentiometer device, the method further includes:

according to the resistance value of the resistor connected to the potentiometer device, determining the total resistance of the potentiometer device as:

$$R_T = (R_{AB} + R_{BC})//R_{AC} = \frac{\left(\frac{u}{1+\frac{hu}{a}} + \frac{1}{1+\frac{l}{b}}\right)\frac{cR}{m}}{\frac{u}{1+\frac{hu}{a}} + \frac{1}{1+\frac{l}{b}} + \frac{c}{m}},$$

where $R_{AB}$ represents equivalent resistance between the first fixed contact and the variable terminal of the potentiometer device, $R_{AC}$ represents equivalent resistance between the first fixed contact and the second fixed contact of the potentiometer device, and R represents the reference resistance.

According to specific embodiments provided by the present disclosure, the present disclosure discloses the following technical effects.

The present disclosure discloses a potentiometer device and a method for determining a number of closed DIP switches. A DIP switch structure is connected in parallel with a potentiometer. The DIP switch structure at least includes a branch circuit formed by connecting one DIP switch and one resistor in series. Compared with a wire-wound potentiometer, a carbon film potentiometer, a straight slide potentiometer, and a rotary potentiometer, the design of the potentiometer that controls whether a resistor is connected to a circuit by the DIP switch, can achieve a required voltage division ratio, high debugging speed, and high efficiency only by closing the switch, and there is no problem of slide wear, resistor body wear, or the like. In addition, the DIP switch has certain stability, a closing/opening state of the DIP switch will not be changed easily, a virtual connection of the DIP switch will not be generated, and the DIP switch has strong adaptability to wet and hot environment. Compared with a digital potentiometer with a control circuit, the potentiometer has simple design, a wide working voltage range, and low cost.

BRIEF DESCRIPTION OF THE DRAWINGS

To describe the technical solutions in embodiments of the present disclosure or in the prior art more clearly, the accompanying drawings required in the embodiments are briefly described below. Apparently, the accompanying drawings in the following description show merely some embodiments of the present disclosure, and other drawings can be derived from these drawings by those of ordinary skill in the art without creative efforts.

FIG. 1A is a schematic diagram of a first voltage division of the potentiometer; FIG. 1B is a schematic diagram of a second voltage division of the potentiometer;

FIG. 13A is a schematic diagram of a Y-type connection; FIG. 13B is a schematic diagram of a triangular connection; and FIG. 14 is a flowchart of a method for determining a number of closed DIP switches according to Embodiment 2 of the present disclosure.

DETAILED DESCRIPTION OF THE EMBODIMENTS

Technical solutions in the embodiments of the present disclosure will be clearly and completely described below with reference to the drawings in the embodiments of the present disclosure. Apparently, the described embodiments are merely part rather than all of the embodiments of the present disclosure. On the basis of the embodiments of the present disclosure, all other embodiments obtained by those of ordinary skill in the art without creative work fall within protection scope of the present disclosure.

An objective of some embodiments of the present disclosure is to provide a potentiometer device and a method for determining a number of closed DIP switches, so as to realize convenient debugging, stable performance, and long durability of a potentiometer.

In order to make the abovementioned objective, features, and advantages of the present disclosure more apparent and more comprehensible, the present disclosure is further described in detail below with reference to the drawings and the detailed description of the embodiments.

Embodiment 1

An embodiment of the present disclosure provides a potentiometer device, which includes a potentiometer and multiple DIP switch structures. Each DIP switch structure is connected in parallel with the potentiometer. Each DIP switch structure at least includes a branch circuit formed by connecting one DIP switch and one resistor in series.

Figures 1A, 1B:
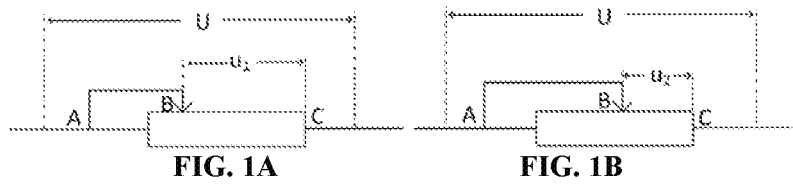
FIGS. 1A-1B are schematic diagrams of voltage division of a potentiometer in the prior art.
Figure 2:
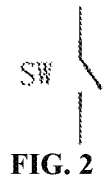
FIG. 2 is a schematic diagram of a structure of a DIP switch according to Embodiment 1 of the present disclosure.

The DIP switch is a single-pole single-throw switch, which has the characteristic that the switch can only be in a closed state or an open state at the same moment, that is, the switch is either closed to form a closed circuit or opened to form an open circuit. The structure of the DIP switch is shown in FIG. 2, and its name is often represented by "SW".

Only when the DIP switch is closed, an element connected in series with the DIP switch is connected to the circuit. Therefore, multiple DIP switches may be connected to the potentiometer circuit and may be connected in series with different resistors. Thus, the DIP switches can be operated to open or close, for allowing corresponding resistors to be connected to the potentiometer circuit, and in turn allowing the potentiometer to generate an appropriate voltage division ratio.

There are many structures formed by connecting the DIP structures and the resistors in series. Different structures are connected to the potentiometer in parallel to form potentiometer devices of different structures. Specific structures are as follows.

(1) A 1 DIP Switch-Resistor Branch-Based 2-Terminal Type

The simplest structure formed by the DIP switch and the resistor is a structure that one DIP switch is connected in series with one resistor. The structure has only one branch circuit in which the DIP switch is connected in series with the resistor, and has an upper connecting terminal and a lower connecting terminal. Therefore, the structure is called the "1 DIP switch-resistor branch-based 2-terminal type", and its schematic diagram is shown in FIG. 3.

The DIP switch structure includes a first branch circuit. One terminal of the first branch circuit is connected to a first fixed contact of the potentiometer, and an other terminal of the first branch circuit is connected to a variable terminal of the potentiometer.

Figure 3:
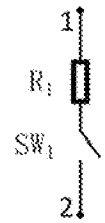
FIG. 3 is a schematic diagram of a 1 DIP switch-resistor branch-based 2-terminalterminal type structure according to Embodiment 1 of the present disclosure.

N "1 DIP switch-resistor branch-based 2-terminal type" structures shown in FIG. 3 are connected in parallel to ends A and B of the potentiometer. Different numbers of resistors may be connected to the circuit by controlling the number of closed DIP switches, so as to change the total resistance $R_T$ of the potentiometer and the voltage division ratio γ generated at ends B and C. The schematic diagram of the circuit using the structure is shown in FIG. 4.

"$R_i^{SW\alpha}$" used in the present description represents a resistor, where "i" represents that the resistor is the i th resistor from left to right of the N connected resistors, "SW" represents that the resistor is connected to the DIP switch, and "a" represents that the resistor is connected to the end A of the potentiometer; "$SW\alpha_i$" represents the DIP switch, where "i" and "a" respectively correspond to "i" and "a" in the connected resistors; "Ru" represents a protective resistor connected between ends A and B of the potentiometer; and "$R_d$" represents a protective resistor connected between ends B and C of the potentiometer.

Figure 4:
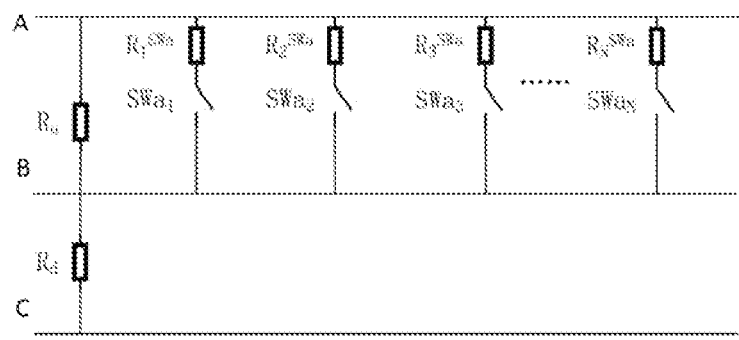
FIG. 4 is a schematic diagram of a 1 DIP switch-resistor branch-based 2terminal type circuit according to Embodiment 1 of the present disclosure.

In FIG. 4, $R_i^{SW\alpha}$ is connected between ends A and B as long as the switch at $SW\alpha_i$ is closed.

(2) A 2 DIP Switch-Resistor Branches-Based 3-Terminal Type

Figure 5:
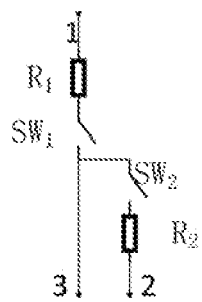
FIG. 5 is a schematic diagram of a 2 DIP switch-resistor branches-based 3-terminal structure according to Embodiment 1 of the present disclosure.

The potentiometer generally includes three terminals including two ends of a resistor body and a brush. Therefore, one DIP switch and one resistor connected in series is also added on the basis of FIG. 3, so that the structure has 3 connecting terminals. The structure has two branch circuits in which the DIP switch is connected in series with the resistor and 3 terminals, so the structure may be called the "2 DIP switch-resistor branches-based 3-terminal type", its schematic diagram is shown in FIG. 5. The 3 terminals of the structure may be connected to ends A, B, and C of the potentiometer respectively.

N "2 DIP switch-resistor branches-based 3-terminal type" structures shown in FIG. 5 are connected to the potentiometer in parallel. The total resistance $R_T$ and the voltage division ratio γ of the ends B and C may also be controlled by the number of the closed DIP switches. The structure shown in FIG. 5 has 3 terminals. Each terminal may be connected to each of the ends A, B, and C of the potentiometer. Therefore, the structure shown in FIG. 3 has 3 connecting methods, and there are 3 types of specific circuit structures, which are respectively shown in FIG. 6, FIG. 7, and FIG. 8.

First connecting method:

The DIP switch structure includes: a second branch circuit and a third branch circuit. The second branch circuit is connected in series with the third branch circuit. A first terminal of a combination of the second branch circuit and the third branch circuit in series is connected to a first fixed contact of the potentiometer; a second terminal of the combination of the second branch circuit and the third branch circuit in series is connected to a second fixed contact of the potentiometer; and a connecting point of the second branch circuit with the third branch circuit is connected to a variable terminal of the potentiometer.

Figure 6:
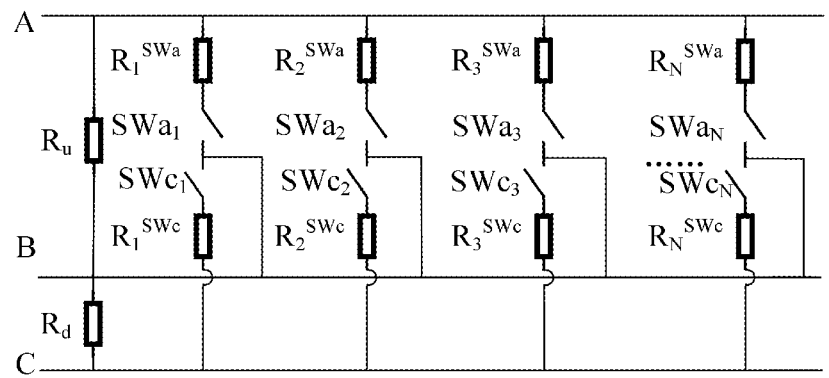
FIG. 6 is a schematic diagram of an AC-type 2 DIP switch-resistor branches-based 3-terminal type circuit according to Embodiment 1 of the present disclosure.

FIG. 6 is a schematic diagram of an AC-type 2 DIP switch-resistor branches-based 3-terminal type circuit. In FIG. 6, a corresponding resistor $R_i^{SW\alpha}$ is connected between ends A and B when the switch at $SW\alpha_i$ is closed, and a corresponding resistor $R_i^{SWc}$ is connected between ends B and C when the switch at $SWc_i$ is closed.

Second connecting method:

The DIP switch structure includes a fourth branch circuit and a fifth branch circuit. One terminal of the fourth branch circuit is connected to a first fixed contact of a potentiometer; an other terminal of the fourth branch circuit is connected to a second fixed contact of the potentiometer and one terminal of the fifth branch circuit; and an other terminal of the fifth branch circuit is connected to a variable terminal of the potentiometer.

Figure 7:
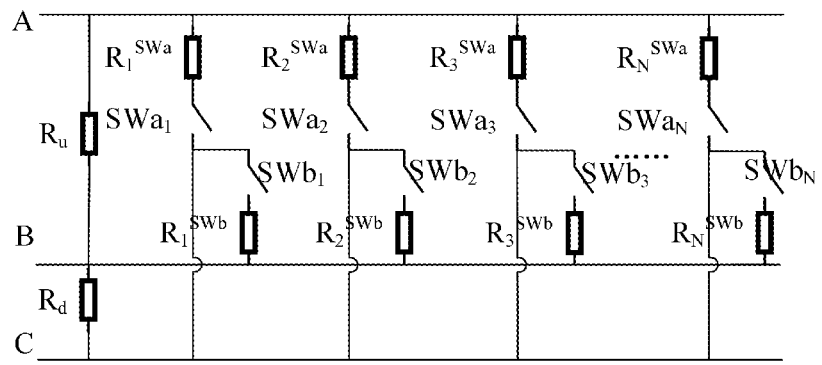
FIG. 7 is a schematic diagram of an AB-type 2 DIP switch-resistor branches-based 3-terminal type circuit according to Embodiment 1 of the present disclosure.

FIG. 7 is a schematic diagram of an AB-type 2 DIP switch-resistor branches-based 3-terminal type circuit. In FIG. 7, a corresponding resistor $R_i^{SW\alpha}$ is connected between ends A and C when the switch at $SW\alpha_i$ is closed, and a corresponding resistor $R_i^{SWb}$ is connected between ends B and C when the switch at $SWb_i$ is closed.

Third connecting method:

The DIP switch structure includes a sixth branch circuit and a seventh branch circuit. Both one terminal of the sixth branch circuit and one terminal of the seventh branch circuit are connected to a first fixed contact of a potentiometer; an other terminal of the sixth branch circuit is connected to a second fixed contact of the potentiometer; and an other terminal of the seventh branch circuit is connected to a variable terminal of the potentiometer.

Figure 8:
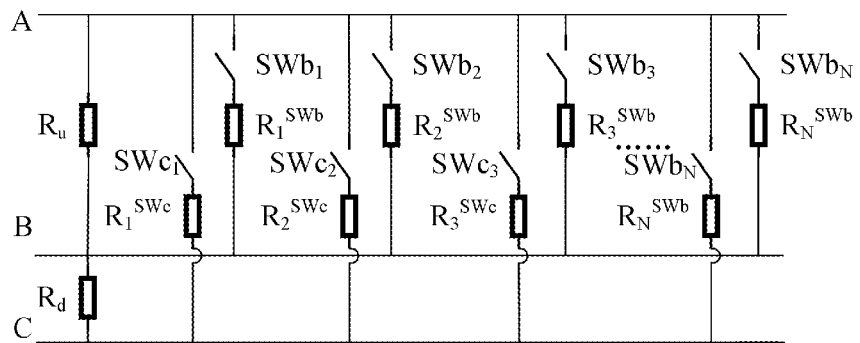
FIG. 8 is a schematic diagram of a BC-type 2 DIP switch-resistor branches-based 3-terminal type circuit according to Embodiment 1 of the present disclosure.

FIG. 8 is a schematic diagram of a BC-type 2 DIP switch-resistor branches-based 3-terminal type circuit. In FIG. 8, a corresponding resistor $R_i^{SWc}$ is connected between ends A and C when the switch at $SWc_i$ is closed, and a corresponding resistor $R_i^{SW\alpha}$ is connected between ends A and B when the switch at $SWb_i$ is closed.

(3) A 3 DIP Switch Branches-Based Triangular 3-Terminal Type

Figure 9:
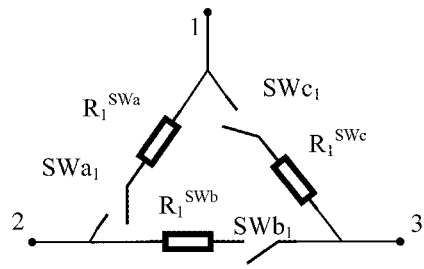
FIG. 9 is a schematic diagram of a 3 DIP switch branches-based triangular 3-terminal type structure according to Embodiment 1 of the present disclosure.

A connection between a DIP switch and a resistor may also use a triangular connection, that is, each resistor is connected in series with one DIP switch. Both structures have 3 branch circuits in which the DIP switch is connected in series with the resistor and 3 terminals, so the structure may be called the "3 DIP switch branches-based triangular 3-terminal type", and a triangular connection structure is shown in FIG. 9.

The DIP switch structure includes an eighth branch circuit, a ninth branch circuit, and a tenth branch circuit. The eighth branch circuit, the ninth branch circuit, and the tenth branch circuit are connected end to end in turn to form a triangular 3-terminal type DIP switch structure. A first terminal of the triangular 3-terminal type DIP switch structure is connected to a first fixed contact of a potentiometer; a second terminal of the triangular 3-terminal type DIP switch structure is connected to a second fixed contact of the potentiometer; and a third terminal of the triangular 3-terminal type DIP switch structure is connected to a variable terminal of the potentiometer.

Figure 10:
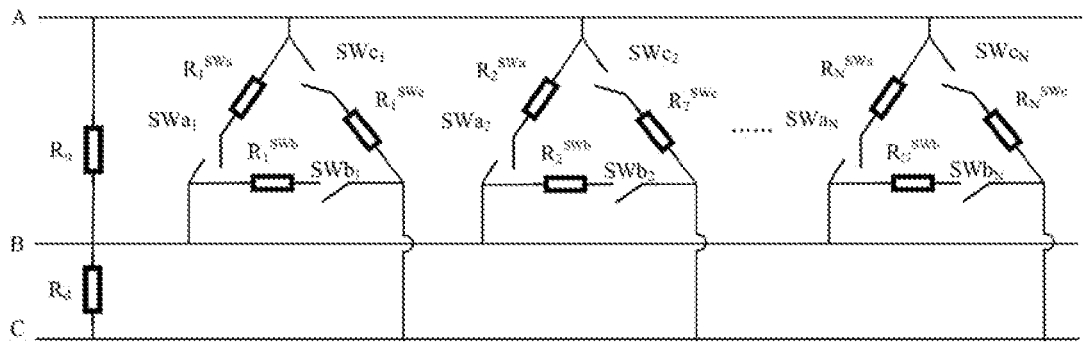
FIG. 10 is a schematic diagram of a 3 DIP switch branches-based triangular 3-terminal type circuit according to Embodiment 1 of the present disclosure.

A schematic diagram of the circuit in which N "3 DIP switch branches-based triangular 3-terminal type" structures are connected in parallel with the potentiometer is shown in FIG. 10.

In the circuit in FIG. 10, $R_i^{SWa}$ is connected between ends A and B as long as the switch at $SW\alpha_i$ is closed; $R_i^{SWb}$ is connected between ends B and C as long as the switch at $SWb_i$ is closed; and $R_i^{SWc}$ is connected between ends A and C as long as the switch at $SWc_i$ is closed.

(4) A 3 DIP Switch Branches-Based Y-Type 3-Terminal Type

Figure 11:
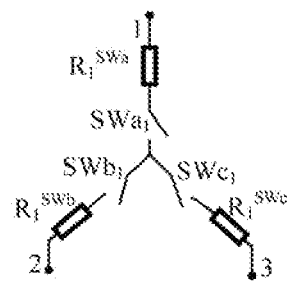
FIG. 11 is a schematic diagram of a 3 DIP switch branches-based Y-type 3-terminal type structure according to Embodiment 1 of the present disclosure.

A connection between a DIP switch and a resistor may also use a Y-type connection, that is, each resistor is connected in series with one DIP switch. Both structures have 3 branch circuits in which the DIP switch is connected in series with the resistor and 3 terminals, so the structure may be called the "3 DIP switch branches-based Y-type 3-terminal type". A Y-type connection structure is shown in FIG. 11.

The DIP switch structure includes an eleventh branch circuit, a twelfth branch circuit, and a thirteenth branch circuit. One terminal of the eleventh branch circuit, one terminal of the twelfth branch circuit, and one terminal of the thirteenth branch circuit are connected at the same point. An other terminal of the eleventh branch circuit is connected to a first fixed contact of a potentiometer; an other terminal of the twelfth branch circuit is connected to a second fixed contact of the potentiometer; and an other terminal of the thirteenth branch circuit is connected to a variable terminal of the potentiometer.

Figure 12:
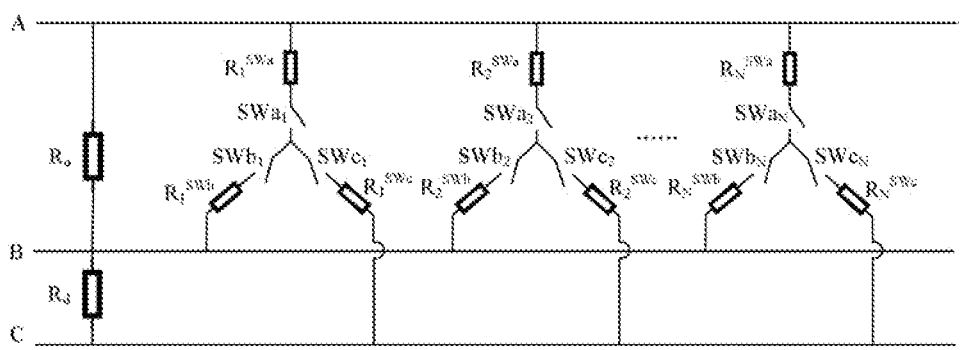
FIG. 12 is a schematic diagram of a 3 DIP switch branches-based Y-type 3-terminal type circuit according to Embodiment 1 of the present disclosure.

A schematic diagram of the circuit in which N "3 DIP switch branches-based Y-type 3-terminal type" structures are connected in parallel with the potentiometer is shown in FIG. 12.

Figure 13A:
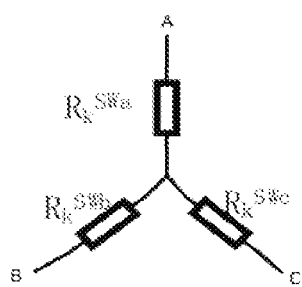
FIGS. 13A-13B are schematic diagrams showing that a Y-type connection is equivalent to a triangular connection according to Embodiment 1 of the present disclosure.
Figure 13B:
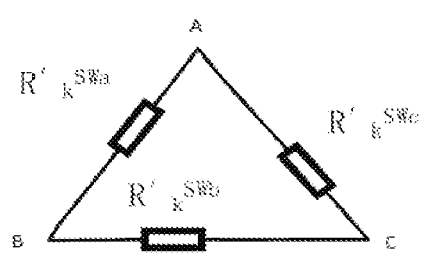

In the circuit in FIG. 12, when both switches at $SW\alpha_i$ and $SWb_i$ are closed, $R_i^{SWa}+R_i^{SWb}$ is connected between ends A and B; when both switches at $SW\alpha_i$ and $SWc_i$ are closed, $R_i^{SWa}+R_i^{SWc}$ is connected between ends A and C; and when both switches at $SWb_i$ and $SWc_i$ are closed, $R_i^{SWb}+R_i^{SWc}$ is connected between ends B and C. The Y-type connection may be equivalent to the triangular connection, as shown in FIGS. 13A-13B, when all switches at $SW\alpha_i$, $SWb_i$, and $SWc_i$ are closed, an equivalent calculation formula is as follows:

$$R_k^{SWa} = R_k^{SWa} + R_k^{SWb} + \frac{R_k^{SWa}R_k^{SWb}}{R_k^{SWc}}$$

$$R_k^{SWb} = R_k^{SWb} + R_k^{SWc} + \frac{R_k^{SWb}R_k^{SWc}}{R_k^{SWa}}$$

$$R_k^{SWc} = R_k^{SWa} + R_k^{SWc} + \frac{R_k^{SWa}R_k^{SWc}}{R_k^{SWb}}$$

If the switch at $SW\alpha_i$ in the circuit in FIG. 10 is open all the time, the circuit may be equivalent to the circuit shown in FIG. 7; if the switch at $SWb_i$ in the circuit in FIG. 10 is open all the time, at this moment, the circuit may be equivalent to the circuit shown in FIG. 8; and if the switch at $SWc_i$ in the circuit in FIG. 10 is open all the time, the circuit may be equivalent to the circuit shown in FIG. 6. If the switches at $SWb_i$ and $SWc_i$ in the circuit in FIG. 10 are open all the time, the circuits may be equivalent to the circuit in FIG. 12 in which the switch at $SWc_i$ is open all the time; if the switches at $SW\alpha_i$ and $SWc_i$ in the circuit in FIG. 10 are open all the time, the circuit may be equivalent to the circuit in FIG. 12 in which the switch at $SW\alpha_i$ is open all the time; and if the switches at $SW\alpha_i$ and $SWb_i$ in the circuit in FIG. 10 are open all the time, the circuit may be equivalent to the circuit in FIG. 12 in which the switch at $SWb_i$ is open all the time.

In conclusion, "a schematic diagram of a 3 DIP switch branches-based triangular 3-terminal type circuit" shown in FIG. 10 is a relatively comprehensive circuit.

Compared with a wire-wound potentiometer, a carbon film potentiometer, a straight slide potentiometer, and a rotary potentiometer, the design of the potentiometer that controls whether a resistor is connected to a circuit by the DIP switch, can achieve a required voltage division ratio, high debugging speed, and high efficiency only by closing the switch, and there is no problem of slide wear, resistor body wear, or the like. In addition, the DIP switch has certain stability, a closing/opening state of the DIP switch will not be changed easily, a virtual connection of the DIP switch will not be generated, and the DIP switch has strong adaptability to wet and hot environment. Compared with a digital potentiometer containing a control circuit, the potentiometer has a simple design, a wide working voltage range, and low cost.

Embodiment 2

An embodiment of the present disclosure provides a method for determining a number of closed DIP switches. As shown in FIG. 14, the method is used for a potentiometer device using a 3 DIP switch branches-based triangular 3-terminal type in Embodiment 1. The method includes step S1-S6.

In step S1, when a number of DIP switch structures in the potentiometer device is N, with a resistor between a variable terminal and a second fixed contact of a potentiometer as a reference resistor, a resistance value of a resistor between a first fixed contact and the variable terminal of the potentiometer, a resistance value of a resistor in each eighth branch circuit, a resistance value of a resistor in each ninth branch circuit, and a resistance value of a resistor in each tenth branch circuit are set as different multiples of a resistance value of the reference resistor.

In step S2, a resistor connected to the potentiometer device is determined according to a number of closed DIP switches of all eighth branch circuits, a number of closed DIP switches of all ninth branch circuits, and a number of closed DIP switches of all tenth branch circuits in the potentiometer device.

In step S3, a voltage division ratio between the variable terminal and the second fixed contact of the potentiometer device is determined according to a resistance value of the resistor connected to the potentiometer device.

A calculation formula for the voltage division ratio between the variable terminal and the second fixed contact of the potentiometer device is:

$$\gamma = \frac{R_{BC}}{R_T} = \frac{\frac{1}{1+\frac{l}{b}}\left(\frac{u}{1+\frac{hu}{a}}+\frac{1}{1+\frac{l}{b}}+\frac{c}{m}\right)}{\left(\frac{u}{1+\frac{hu}{a}}+\frac{1}{1+\frac{l}{b}}\right)\frac{c}{m}},$$

where $\gamma$ represents the voltage division ratio, $R_{BC}$ represents an equivalent resistance between the variable terminal and the second fixed contact of the potentiometer device, $R_T$ represents total resistance of the potentiometer device, u, $\alpha$, b, and c respectively represent multiples by which a resistance value of the reference resistor is multiplied to obtain the resistance value of the resistor between the first fixed contact and the variable terminal, the resistance value of the resistor in the eighth branch circuit, the resistance value of the resistor in the ninth branch circuit, and the resistance value of the resistor in the tenth branch circuit respectively, and h, l, and m respectively represent the number of closed DIP switches of all eighth branch circuits, all ninth branch circuits, and all tenth branch circuits in the potentiometer device.

According to the resistance value of the resistor connected to the potentiometer device, the total resistance of the potentiometer device may be further determined as:

$$R_T = (R_{AB} + R_{BC}) // R_{AC} = \frac{\left(\frac{u}{1+\frac{hu}{a}} + \frac{1}{1+\frac{l}{b}}\right)\frac{cR}{m}}{\frac{u}{1+\frac{hu}{a}} + \frac{1}{1+\frac{l}{b}} + \frac{c}{m}},$$

where $R_{AB}$ represents equivalent resistance between the first fixed contact and the variable terminal of the potentiometer device, $R_{AC}$ represents equivalent resistance between the first fixed contact and the second fixed contact of the potentiometer device, and R represents the reference resistance.

In step S4, the number of closed DIP switches of all eighth branch circuits, the number of closed DIP switches of all ninth branch circuits, and the number of closed DIP switches of all tenth branch circuits in the potentiometer device are changed, step that "a resistor connected to the potentiometer device is determined according to the number of closed DIP switches of all eighth branch circuits, the number of closed DIP switches of all ninth branch circuits, and the number of closed DIP switches of all tenth branch circuits in the potentiometer device" is returned, and voltage division ratios corresponding to different combinations of numbers of closed DIP switches are obtained to form a correspondence table between the numbers of closed DIP switches and the voltage division ratios when the number of the DIP switch structures in the potentiometer device is N.

In step S4, the number N of the DIP switch structures in the potentiometer device is changed, the step that "when a number of DIP switch structures in the potentiometer device is N, with a resistor between a variable terminal and a second fixed contact of the potentiometer as a reference resistor, a resistance value of a resistor between a first fixed contact and the variable terminal of the potentiometer, a resistance value of a resistor in an eighth branch circuit, a resistance value of a resistor in a ninth branch circuit, and a resistance value of a resistor in a tenth branch circuit are set as different multiples of a resistance value of the reference resistor" is returned, and each correspondence table between the numbers of closed DIP switches and the voltage division ratios when the number N is set to different value is obtained.

In step S5, the number of closed DIP switches of all eighth branch circuits, the number of closed DIP switches of all ninth branch circuits, and the number of closed DIP switches of all tenth branch circuits in a potentiometer device to be adjusted are obtained by querying a correspondence table corresponding to a number of DIP switch structures in the potentiometer device to be adjusted according to the number of DIP switch structures in the potentiometer device to be adjusted and a target voltage division ratio.

In step S6, DIP switches in the potentiometer device to be adjusted are closed according to the number of closed DIP switches of all eighth branch circuits, the number of closed DIP switches of all ninth branch circuits, and the number of closed DIP switches of all tenth branch circuits in the potentiometer device to be adjusted.

Next, with FIG. 10 as an example, a mathematical relationship between the number of closed switches at different positions and the voltage division ratio $\gamma$ in the circuit is explained.

If there are N "3 DIP switch branches-based triangular 3-terminal type" modules in the circuit shown in FIG. 10, $R_{AB}$, $R_{AC}$, and $R_{BC}$ respectively represent equivalent resistance between ends A and B, between ends A and C, and between ends B and C except $R_u$ and $R_d$ in the circuit in FIG. 17, and there are h closed switches at SWa, l closed switches at SWb, and m closed switches at SWc (h, l and m are all integers and are not greater than N);

H, L, and M are respectively subscript sets of the resistors connected in parallel between A and B, between B and C, and between A and C, then:

$$R_{AB} = \frac{R_u \prod_{i \in H} R_i^{SWa}}{\prod_{i \in H} R_i^{SWa} + hR_u \sum_{K \in H}\left(\prod_{\substack{i \in H \\ i \neq K}} R_i^{SWa}\right)},$$

$$R_{BC} = \frac{R_d \prod_{i \in L} R_i^{SWb}}{\prod_{i \in L} R_i^{SWb} + lR_d \sum_{K \in L}\left(\prod_{\substack{i \in L \\ i \neq K}} R_i^{SWb}\right)},$$

$$R_{AC} = \frac{\prod_{i \in M} R_i^{SWc}}{m \sum_{K \in M}\left(\prod_{\substack{i \in M \\ i \neq K}} R_i^{SWc}\right)}.$$

The total resistance of the circuit is: $R_T = (R_{AB} + R_{BC}) // R_{AC}$.

The voltage division ratio between the ends B and C of the circuit is:

$$\gamma = \frac{R_{BC}}{R_T}.$$

For the convenience of calculation, resistance values of all $R_i^{Swa}$ are equal, resistance values of all $R_i^{SWb}$ are equal, resistance values of all $R_i^{SWc}$ are equal, and one resistor is selected as a reference resistor. Each resistor may be used as the reference resistor. If $R_u$ is selected as the reference resistor, $R_u=R$, then $R_d=dR$, $R_i^{SWa}=\alpha R$, $R_i^{SWb}=bR$, and $R_i^{SWc}=cR$; and if $R_d$ is selected as the reference resistor, $R_d=R$, then $R_u=uR$, $R_i^{SWa}=\alpha R$, $R_i^{SWb}=bR$, and $R_i^{SWc}=cR$. Here, $R_d$ is selected as the reference resistor, u, $\alpha$, b, and c are all constants, and the above formula may be simplified as:

$$R_{AB} = \frac{uR}{1+\frac{hu}{a}},$$

$$R_{BC} = \frac{R}{1+\frac{l}{b}},$$

$$R_{AC} = \frac{cR}{m},$$

$$R_T = (R_{AB}+R_{BC})//R_{AC} = \frac{\left(\frac{u}{1+\frac{hu}{a}}+\frac{1}{1+\frac{l}{b}}\right)\frac{cR}{m}}{\frac{u}{1+\frac{hu}{a}}+\frac{1}{1+\frac{l}{b}}+\frac{c}{m}},$$

$$\gamma = \frac{R_{BC}}{R_T} = \frac{\frac{1}{1+\frac{l}{b}}\left(\frac{u}{1+\frac{hu}{a}}+\frac{1}{1+\frac{l}{b}}+\frac{c}{m}\right)}{\left(\frac{u}{1+\frac{hu}{a}}+\frac{1}{1+\frac{l}{b}}\right)\frac{c}{m}}.$$

Through calculation, it can be known that the total resistance $R_T$ is related to R, and the voltage division ratio $\gamma$ is not related to R. $\alpha=100$, b=1, c=1, and u=100 are set, correspondences between the voltage division ratios $\gamma$ and the number of closed switches h at SWa, the number of closed switches l at SWb, and the number of closed switches m at SWc are shown in the following table:

TABLE 1

Correspondence between value of $\gamma$ and values of h, l, and m

| Value of $\gamma$ | Values of h, l, and m |
|---|---|
| 1/8 | h = 1, m = 1, and l = 7 |
| 1/5 | h = 1, m = 1, and l = 4 |
| 1/4 | h = 1, m = 1, and l = 3 |
| 1/3 | h = 1, m = 1, and l = 2 |
| 1/2 | h = 1, m = 1, and l = 1 |
| 2/3 | h = 1, m = 2, and l = 2 |
| 3/4 | h = 1, m = 3, and l = 3 |
| 4/5 | h = 1, m = 4, and l = 4 |

In conclusion, for a potentiometer which controls whether a resistor is connected to a circuit by using a DIP switch, it is desirable to select appropriate parameters such as u, $\alpha$, b, and c, resistance R, and total number of modules N during manufacturing of potentiometer, so as to obtain a correspondence table between the total resistance $R_T$, the voltage division ratio $\gamma$ of the potentiometer and the number of the closed switches When the potentiometer is connected to a circuit for use, a target voltage division ratio $\gamma$ may be obtained by closing a certain number of switches according to the correspondence between the voltage division ratio $\gamma$ and the number of the closed switches.

Various embodiments of the present specification are described in a progressive manner. Each embodiment focuses on the difference from other embodiments, and the same and similar parts between the embodiments may refer to each other.

In this specification, specific examples are used to describe the principle and implementations of the present disclosure. The description of the above embodiments is merely used to help understand the method and core idea of the present disclosure. In addition, those skilled in the art may make modifications in terms of the specific implementations and the application scope in accordance with the idea of the present disclosure. In conclusion, the content of the present specification shall not be construed as limitations to the present disclosure.

What is claimed is:

1. A potentiometer device, comprising:
a potentiometer and a plurality of DIP switch structures, wherein:
each DIP switch structure is connected in parallel with the potentiometer;
each DIP switch structure comprises a branch circuit formed by connecting one DIP switch and one resistor in series;
at least one of the DIP switch structures comprises an eighth branch circuit, a ninth branch circuit, and a tenth branch circuit;
the eighth branch circuit, the ninth branch circuit, and the tenth branch circuit are connected end to end in turn to form a triangular 3-terminal type DIP switch structure;
a first terminal of the triangular 3-terminal type DIP switch structure is connected to a first fixed contact of the potentiometer;
a second terminal of the triangular 3-terminal type DIP switch structure is connected to a second fixed contact of the potentiometer; and
a third terminal of the triangular 3-terminal type DIP switch structure is connected to a variable terminal of the potentiometer.

2. The potentiometer device according to claim 1, wherein:
a first terminal of the eighth branch circuit is connected to the first fixed contact of the potentiometer, and a second terminal of the eighth branch circuit is connected to the variable terminal of the potentiometer.

3. The potentiometer device according to claim 2, wherein:
a first terminal of the ninth branch circuit is connected to the first fixed contact of the potentiometer, and a second terminal of the ninth branch circuit is connected to the second fixed contact of the potentiometer; and
a first terminal of the tenth branch circuit is connected to the second fixed contact of the potentiometer, and a second terminal of the tenth branch circuit is connected to the variable terminal of the potentiometer.

4. A method for determining a number of closed DIP switches used for the potentiometer device according to claim 1, comprising:
when a number of the DIP switch structures in the potentiometer device is N, with a resistor between a variable terminal and a second fixed contact of the potentiometer as a reference resistor, setting a resistance value of a resistor between a first fixed contact and the variable terminal of the potentiometer, a resistance value of a resistor in each eighth branch circuit, a resistance value of a resistor in each ninth branch circuit, and a resistance value of a resistor in each tenth branch circuit as different multiples of a resistance value of the reference resistor;
determining a resistor connected to the potentiometer device according to a number of closed DIP switches of all eighth branch circuits, a number of closed DIP switches of all ninth branch circuits, and a number of closed DIP switches of all tenth branch circuits in the potentiometer device;

determining a voltage division ratio between the variable terminal and the second fixed contact of the potentiometer device according to a resistance value of the resistor connected to the potentiometer device;

changing the number of closed DIP switches of all eighth branch circuits, the number of closed DIP switches of all ninth branch circuits, and the number of closed DIP switches of all tenth branch circuits in the potentiometer device, returning to step of "determining a resistor connected to the potentiometer device according to a number of closed DIP switches of all eighth branch circuits, a number of closed DIP switches of all ninth branch circuits, and a number of closed DIP switches all tenth branch circuits in the potentiometer device", and obtaining voltage division ratios corresponding to different combinations of numbers of closed DIP switches to form a correspondence table between the numbers of closed DIP switches and the voltage division ratios when the number of the DIP switch structures in the potentiometer device is N;

changing the number N of the DIP switch structures in the potentiometer device, returning to step of "when a number of the DIP switch structures in the potentiometer device is N, with a resistor between a variable terminal and a second fixed contact of the potentiometer as a reference resistor, setting a resistance value of a resistor between a first fixed contact and the variable terminal of the potentiometer, a resistance value of a resistor in the eighth branch circuit, a resistance value of a resistor in the ninth branch circuit, and a resistance value of a resistor in the tenth branch circuit as different multiples of a resistance value of the reference resistor", and obtaining each correspondence table between the numbers of closed DIP switches and the voltage division ratios when the number N is set to different value;

obtaining the number of closed DIP switches of all eighth branch circuits, the number of closed DIP switches of all ninth branch circuits, and the number of closed DIP switches of all tenth branch circuits in the potentiometer device to be adjusted by querying a correspondence table corresponding to a number of the DIP switch structures in the potentiometer device to be adjusted according to the number of the DIP switch structures in the potentiometer device to be adjusted and a target voltage division ratio; and closing DIP switches in the potentiometer device to be adjusted according to the number of closed DIP switches of all eighth branch circuits, the number of closed DIP switches of all ninth branch circuits, and the number of closed DIP switches of all tenth branch circuits in the potentiometer device to be adjusted.

5. The method according to claim 4, wherein a calculation formula for the voltage division ratio between the variable terminal and the second fixed contact of the potentiometer device is:

$$\gamma = \frac{R_{BC}}{R_T} = \frac{\frac{1}{1+\frac{l}{b}}\left(\frac{u}{1+\frac{hu}{a}} + \frac{1}{1+\frac{l}{b}} + \frac{c}{m}\right)}{\left(\frac{u}{1+\frac{hu}{a}} + \frac{1}{1+\frac{l}{b}}\right)\frac{c}{m}},$$

wherein $\gamma$ represents the voltage division ratio, $R_{BC}$ represents an equivalent resistance between the variable terminal and the second fixed contact of the potentiometer device, $R_T$ represents total resistance of the potentiometer device, u, $\alpha$, b, and c respectively represent multiples by which the resistance value of the reference resistor is multiplied to obtain the resistance value of the resistor between the first fixed contact and the variable terminal, the resistance value of the resistor in the eighth branch circuit, the resistance value of the resistor in the ninth branch circuit, and the resistance value of the resistor in the tenth branch circuit respectively, and h, l, and m respectively represent the number of closed DIP switches of all eighth branch circuits, the number of closed DIP switches of all ninth branch circuits, and the number of closed DIP switches of all tenth branch circuits in the potentiometer device.

6. The method according to claim 5, after determining the voltage division ratio between the variable terminal and the second fixed contact of the potentiometer device according to the resistance value of the resistor connected to the potentiometer device, further comprising:

according to the resistance value of the resistor connected to the potentiometer device, determining the total resistance of the potentiometer device as:

$$R_T = (R_{AB} + R_{BC})//R_{AC} = \frac{\left(\frac{u}{1+\frac{hu}{a}} + \frac{1}{1+\frac{l}{b}}\right)\frac{cR}{m}}{\frac{u}{1+\frac{hu}{a}} + \frac{1}{1+\frac{l}{b}} + \frac{c}{m}},$$

wherein $R_{AB}$ represents equivalent resistance between the first fixed contact and the variable terminal of the potentiometer device, $R_{Ac}$ represents equivalent resistance between the first fixed contact and the second fixed contact of the potentiometer device, and R represents the reference resistance.

7. A potentiometer device, comprising:
a potentiometer and a plurality of DIP switch structures, wherein:
    each DIP switch structure is connected in parallel with the potentiometer; and
    each DIP switch structure at least comprises a branch circuit formed by connecting one DIP switch and one resistor in series;
    at least one of the DIP switch structures comprises an eleventh branch circuit, a twelfth branch circuit, and a thirteenth branch circuit;
    one terminal of the eleventh branch circuit, one terminal of the twelfth branch circuit, and one terminal of the thirteenth branch circuit are connected at a same point;
    another terminal of the eleventh branch circuit is connected to a first fixed contact of the potentiometer;
    another terminal of the twelfth branch circuit is connected to a second fixed contact of the potentiometer; and
    another terminal of the thirteenth branch circuit is connected to a variable terminal of the potentiometer.

\* \* \* \* \*